US010171958B2

(12) United States Patent
Wu et al.

(10) Patent No.: US 10,171,958 B2
(45) Date of Patent: Jan. 1, 2019

(54) MANAGING A MULTIMEDIA BROADCAST MULTICAST SERVICE USING AN MBMS RELAY DEVICE

(71) Applicant: QUALCOMM Incorporated, San Diego, CA (US)

(72) Inventors: Zhibin Wu, Bedminster, NJ (US); Vincent Douglas Park, Budd Lake, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 15/404,283

(22) Filed: Jan. 12, 2017

(65) Prior Publication Data

US 2017/0126417 A1    May 4, 2017

Related U.S. Application Data

(62) Division of application No. 13/954,739, filed on Jul. 30, 2013, now Pat. No. 9,584,985.

(51) Int. Cl.
*H04W 4/16* (2009.01)
*H04W 4/06* (2009.01)
(Continued)

(52) U.S. Cl.
CPC ............ *H04W 4/06* (2013.01); *H04B 7/15* (2013.01); *H04L 12/189* (2013.01); *H04W 4/80* (2018.02); *H04W 8/005* (2013.01)

(58) Field of Classification Search
CPC ......... H04B 7/15; H04L 12/189; H04L 12/18; H04L 12/185; H04L 29/06455;
(Continued)

(56) References Cited

U.S. PATENT DOCUMENTS

| 7,899,391 B2 | 3/2011 | Becker |
| 9,247,411 B2 | 1/2016 | Wu et al. |

(Continued)

FOREIGN PATENT DOCUMENTS

| CN | 101048986 A | 10/2007 |
| CN | 102106164 A | 6/2011 |

(Continued)

OTHER PUBLICATIONS

3GPP: "3rd Generation Partnership Project; Technical Specification Group Services and System Aspects; Study on Architecture Enhancements to Support Proximity Services (ProSe), (Release 12)," 3GPP TR 23.703 v0.45.0 (Jul. 2013), 3rd Generation Partnership Project, Valbonne, France, 189 pgs.

(Continued)

*Primary Examiner* — Benjamin H Elliott, IV
(74) *Attorney, Agent, or Firm* — Holland & Hart LLP

(57) ABSTRACT

Methods, systems, and devices are described for managing a multimedia broadcast multicast service (MBMS). In one configuration, service announcement information for at least one MBMS may be received. At least a subset of the service announcement information may be broadcast in a peer discovery signal. Content of the at least one MBMS may then be relayed to at least one mobile device operating outside a coverage area of a base station. In another configuration, an out-of-coverage status indicator or MBMS query may be broadcast in a first peer discovery signal, and a second peer discovery signal may be received from at least one MBMS relay device. The second peer discovery signal may include at least a subset of service announcement information for at least one MBMS.

16 Claims, 12 Drawing Sheets

(51) Int. Cl.
*H04W 4/80* (2018.01)
*H04B 7/15* (2006.01)
*H04W 8/00* (2009.01)
*H04L 12/18* (2006.01)

(58) Field of Classification Search
CPC . H04L 29/12292; H04L 45/16; H04L 47/806; H04L 61/2069; H04L 65/4076; H04W 4/06; H04W 4/008; H04W 4/80; H04W 8/005; H04W 40/22; H04W 52/46; H04W 88/04; H04W 32/026
See application file for complete search history.

(56) References Cited

U.S. PATENT DOCUMENTS

| | | | |
|---|---|---|---|
| 9,584,985 B2* | 2/2017 | Wu | H04B 7/15 |
| 2005/0282569 A1 | 12/2005 | Kim et al. | |
| 2006/0107287 A1 | 5/2006 | Lee et al. | |
| 2009/0129308 A1 | 5/2009 | Fukui | |
| 2010/0322136 A1 | 12/2010 | Kanazawa et al. | |
| 2012/0236776 A1 | 9/2012 | Zhang et al. | |
| 2013/0007814 A1 | 1/2013 | Cherian et al. | |
| 2013/0016649 A1 | 1/2013 | Damnjanovic et al. | |
| 2013/0065585 A1* | 3/2013 | Pelletier | H04W 4/02 455/435.1 |
| 2013/0160101 A1 | 6/2013 | Hakola et al. | |
| 2013/0287012 A1 | 10/2013 | Pragada et al. | |
| 2014/0056220 A1 | 2/2014 | Poitau et al. | |
| 2014/0153472 A1 | 6/2014 | Phan et al. | |
| 2014/0198708 A1 | 7/2014 | Lee | |
| 2015/0029866 A1 | 1/2015 | Liao et al. | |
| 2015/0036578 A1 | 2/2015 | Wu et al. | |
| 2016/0044634 A1 | 2/2016 | Seo et al. | |
| 2017/0126417 A1* | 5/2017 | Wu | H04L 12/189 |

FOREIGN PATENT DOCUMENTS

| | | | |
|---|---|---|---|
| JP | 2003229954 A | 8/2003 | |
| JP | 2009188926 A | 8/2009 | |
| WO | WO-2011079054 A1 | 6/2011 | |

OTHER PUBLICATIONS

HTC: "UE Relay for Public Safety," S2-132483, SA WG2 Meeting #98, Valencia, Spain, Jul. 15-19, 2013, pp. 1-5.
HTC, "UE Relay for Public Safety," S2-132829, SA WG2 Meeting #98, Valencia, Spain, Jul. 15-19, 2013, pp. 1-6.
Intel: "Solution for Public Safety UE-to-UE Relays," S2-132848, SA WG2 Meeting #98, Valencia, Spain, Jul. 15-19, 2013, pp. 1-7.
ISA/EPO, International Search Report and Written Opinion of the International Searching Authority, Int'l App. No. PCT/US2014/047599, Oct. 29, 2014, European Patent Office, Rijswijk, NL, 10 pgs.
LG Electronics: "Solution on Relay for Public Safety ProSe," S2-132614, SA WG2 Meeting #98, Valencia, Spain, XP050725994,Jul. 15-19, 2013, pp. 1-6.
Qualcomm Incorporated: "Direct Communication one-to-many," S2-132453, SA WG2 Meeting #98, Valencia, Spain, Jul. 15-19, 2013, 6 Pages.
Qualcomm Incorporated: "ProSe UE-to-Network Relays," S2-132455, SA WG2 Meeting #98, Valencia, Spain, Jul. 15-19, 2013, pp. 1-9.
Renasas Mobile Europe Ltd.: "Network Connection via ProSe UE-to-Network Relay," S2-132706, SA WG2 Meeting #98, Valencia, Spain, Jul. 15-19, 2013, pp. 1-3.
Renasas Mobile Europe Ltd.: "Connection Setup via ProSe UE-to-Network Relay," S2-131971, SA WG2 Meeting #98, Valencia, Spain, Jul. 15-19, 2013, pp. 1-4.
IPEA/EPO, Second Written Opinion of the International Preliminary Examining Authority, Int'l App. No. PCT/US2014/047599, dated Mar. 5, 2015, European Patent Office, Munich, DE, 6 pgs.
Secretary of SA WG2: "Report of SA WG2 Meetings #98," Version 1.0.0, 3GPP TSG SA WG2 Meeting #98, Jul. 15-19, 2013, Valencia, Spain; downloaded from http://www.3gpp.org/ftp/tsg_sa/WG2_Arch/tsgs2_98_Valencia/report/, 3rd Generation Partnership Project, 244 pgs.
ZTE: "ProSe UE-to-Network Relay," S2-132844, SA WG2 Meeting #98, Valencia, Spain, Jul. 15-19, 2013, pp. 1-3.

* cited by examiner

MANAGING A MULTIMEDIA BROADCAST MULTICAST SERVICE USING AN MBMS RELAY DEVICE

CROSS REFERENCES

The present Application is a Divisional application of U.S. patent application Ser. No. 13/954,739 by Wu et al., entitled "Managing a Multimedia Broadcast Multicast Service Using an MBMS Relay Device," filed Jul. 30, 2013, assigned to the assignee hereof.

BACKGROUND

A wireless communication network may include a number of base stations, NodeBs, or eNodeBs (eNBs) that can support communication for a number of mobile devices or user equipments (UEs). A UE may communicate with a base station via downlink and uplink. The downlink (or forward link) refers to the communication link from the base station to the UE, and the uplink (or reverse link) refers to the communication link from the UE to the base station.

In a 3GPP cellular network, broadcast and multicast services may be transported via a transport service called multimedia broadcast multicast service (MBMS). A broadcast multicast service centre (BM-SC) server is responsible to disseminate the media content to a group of subscribers. When a UE moves out of network coverage, the UE may be unable to use the MBMS because the uplink and downlink connections to that BM-SC server are no longer available.

SUMMARY

The described features generally relate to one or more improved methods, systems, and/or apparatuses for managing a multimedia broadcast multicast service (MBMS).

A method for managing an MBMS is described. In one configuration, service announcement information for at least one MBMS may be received. At least a subset of the service announcement information may be broadcast in a peer discovery signal. Content of the at least one MBMS may then be relayed to at least one mobile device operating outside a coverage area of a base station.

In some embodiments of the method, the at least a subset of the service announcement information to broadcast in the peer discovery signal may be selected.

In some embodiments of the method, one or more parameters of the at least one MBMS may be identified, and it may be determined whether to provide relay services for the at least one MBMS based at least in part on the identified one or more parameters of the at least one MBMS.

In some embodiments of the method, a first notification that the content of the at least one MBMS will be delivered by the base station may be received. In some cases, a second notification may be transmitted to the at least one mobile device upon receiving the first notification.

In some embodiments of the method, at least one multicast stream of the at least one MBMS may be received, and the at least one multicast stream may be retransmitted to the at least one mobile device operating outside the coverage area of the base station.

In some embodiments of the method, the at least one MBMS may be selected from a plurality of MBMS.

In some embodiments of the method, an MBMS relay status may be broadcast in the peer discovery signal. The MBMS relay status may indicate a capability to relay the content of the at least one MBMS.

In some embodiments of the method, identification information may be broadcast in the peer discovery signal.

In some embodiments of the method, a point-to-point link may be established, and the content of the at least one MBMS may be relayed via the point-to-point link.

In some embodiments of the method, a point-to-multipoint link may be established, and the content of the at least one MBMS may be relayed via the point-to-multipoint link.

An apparatus for managing an MBMS is also described. In one configuration, the apparatus may include a means for receiving service announcement information for at least one MBMS, a means for broadcasting at least a subset of the service announcement information in a peer discovery signal, and a means for relaying content of the at least one MBMS to at least one mobile device operating outside a coverage area of a base station.

An apparatus for managing an MBMS is also described. In one configuration, the apparatus may include a processor, a memory in electronic communication with the processor, and instructions stored in the memory. The instructions may be executable by the processor to receive service announcement information for at least one MBMS, broadcast at least a subset of the service announcement information in a peer discovery signal, and relay content of the at least one MBMS to at least one mobile device operating outside a coverage area of a base station.

A computer program product for managing an MBMS is also described. The computer program product may include a non-transitory computer-readable medium storing instructions executable by a processor to receive service announcement information for at least one MBMS, broadcast at least a subset of the service announcement information in a peer discovery signal, and relay content of the at least one MBMS to at least one mobile device operating outside a coverage area of a base station.

Another method for managing an MBMS is also described. In one configuration, an out-of-coverage status indicator or MBMS query may be broadcast in a first peer discovery signal, and a second peer discovery signal may be received from at least one MBMS relay device. The second peer discovery signal may include at least a subset of service announcement information for at least one MBMS.

In some embodiments of the method, an MBMS relay device to deliver content of a particular MBMS may be identified, and a procedure to associate with the identified MBMS relay device may be intitiated. In some cases, the procedure to associate with the identified MBMS relay device may include transmitting a request to join the particular MBMS to the MBMS relay device. The request may be relayed from the MBMS relay device to a core network.

In some embodiments, content addressed to one or more subscribers may be broadcast to an MBMS. The content may be relayed to a network server by one of the at least one MBMS relay device for distribution to the one or more subscribers to the MBMS.

An apparatus for managing an MBMS is also described. In one configuration, the apparatus may include a means for broadcasting an out-of-coverage status indicator or MBMS query in a first peer discovery signal, and a means for receiving a second peer discovery signal from at least one MBMS relay device. The second peer discovery signal may inclue at least a subset of service announcement information for at least one MBMS.

Another apparatus for managing an MBMS is also described. In one configuration, the apparatus may include a processor, a memory in electronic communication with the processor, and instructions stored in the memory. The instructions may be executable by the processor to broadcast an out-of-coverage status indicator or MBMS query in a first peer discovery signal, and receive a second peer discovery signal from at least one MBMS relay device. The second peer discovery signal may include at least a subset of service announcement information for at least one MBMS.

A computer program product for managing an MBMS is also described. The computer program product may include a non-transitory computer-readable medium storing instructions executable by a processor to broadcast an out-of-coverage status indicator or MBMS query in a first peer discovery signal, and receive a second peer discovery signal from at least one MBMS relay device. The second peer discovery signal may include at least a subset of service announcement information for at least one MBMS.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A base station of a wireless communications system is associated with a coverage area. When a mobile device moves outside the coverage area of a base station, it may lose service via the wireless communications system with which the base station is associated. The lost service may, in some cases, include an MBMS. To mitigate the chance of MBMS loss, the mobile device may broadcast an out-of-coverage status indicator or MBMS query in a peer discovery message. An in-coverage device (and possibly a mobile device) that receives the out-of-coverage status indicator or MBMS query may then determine whether it is capable of providing relay services (i.e., functioning as an MBMS relay device) for the MBMS that is desired by the out-of-coverage mobile device. Alternately, an in-coverage mobile device may proactively transition to an MBMS relay status and broadcast service announcement information for at least one MBMS for which it is capable of providing relay services. The service announcement information may be broadcast in a peer discovery signal that, in addition to the service announcement information, may include identification and MBMS relay status information for the broadcasting device. An out-of-coverage mobile device that receives the peer discovery signal of the in-coverage mobile device may then transmit a request to join a desired MBMS. In some cases, the peer discovery signals may be Long Term Evolution (LTE) Direct Peer-Discovery Signals.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
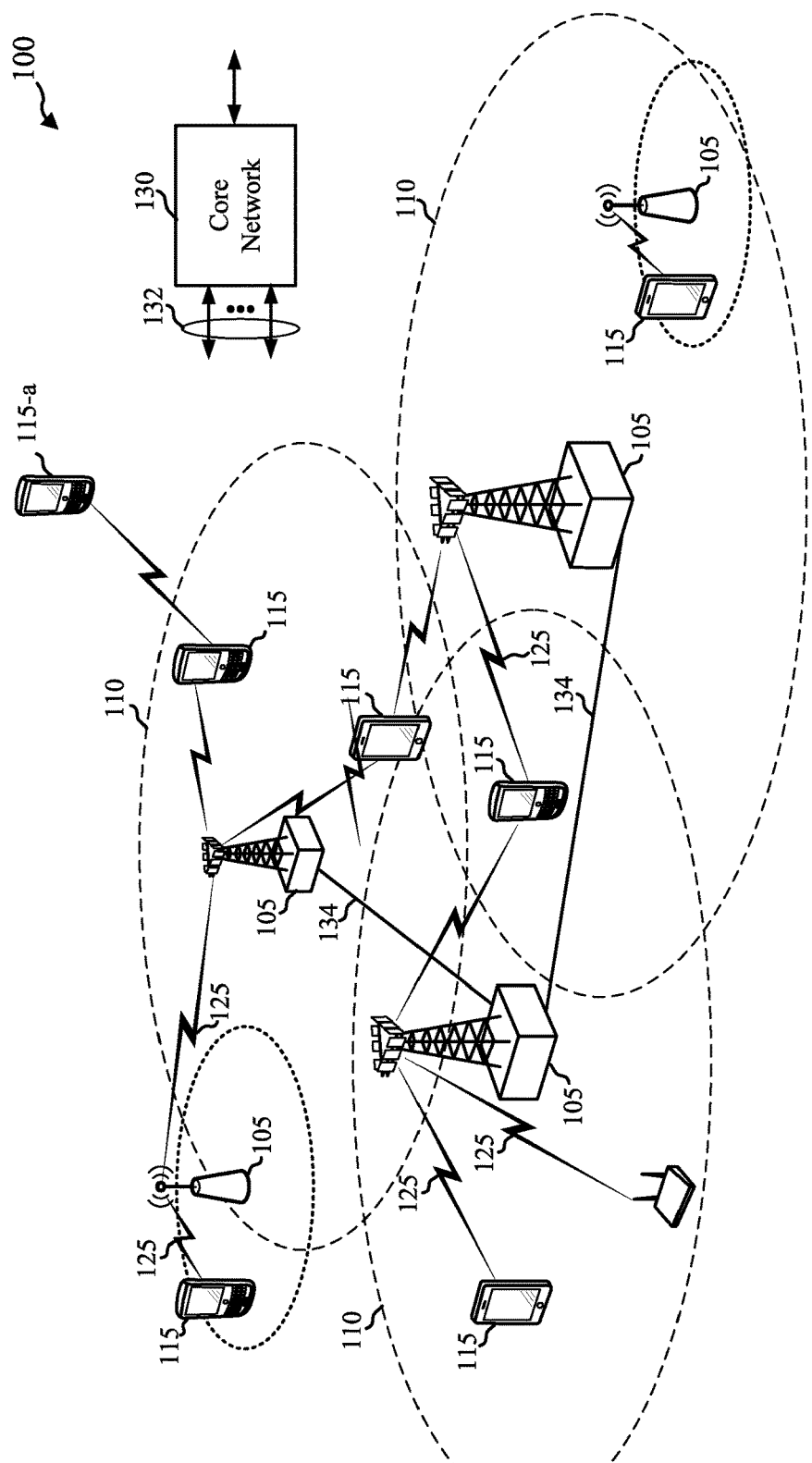
FIG. 1 is a block diagram of an example of a wireless communications system.

Referring first to FIG. 1, a diagram illustrates an example of a wireless communications system 100. The wireless communications system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective coverage area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In embodiments, the system 100 is an LTE/LTE-A network. In LTE/LTE-A networks, the terms evolved Node B (eNB) and user equipment (UE) may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul links 132 (e.g., S1, etc.). The eNBs 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 are dispersed throughout the wireless communications system 100, and each UE may be stationary or mobile. A UE 115 may also be referred to by those skilled in the art as a mobile device, a mobile station, a subscriber station, a mobile unit, a subscriber unit, a wireless unit, a remote unit, a wireless device, a wireless communications device, a remote device, a mobile subscriber station, an access terminal, a mobile terminal, a wireless terminal, a remote terminal, a handset, a user agent, a mobile client, a client, a relay, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In one embodiment, a UE 115 within a coverage area of a base station 105 may serve as a relay for a UE 115-a that is outside the coverage area of the base station 105. The in-coverage UE 115 may relay (or retransmit) communications from the base station 105 to the out-of-coverage UE 115-a. Similarly, the in-coverage UE 115 may relay communications to the base station 105 that are received from the UE 115-a that is outside the coverage area. For example, the in-coverage UE 115 may relay MBMS content to the out-of-coverage UE 115-a.

The communication links 125 shown in wireless communications system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions.

Figure 2:
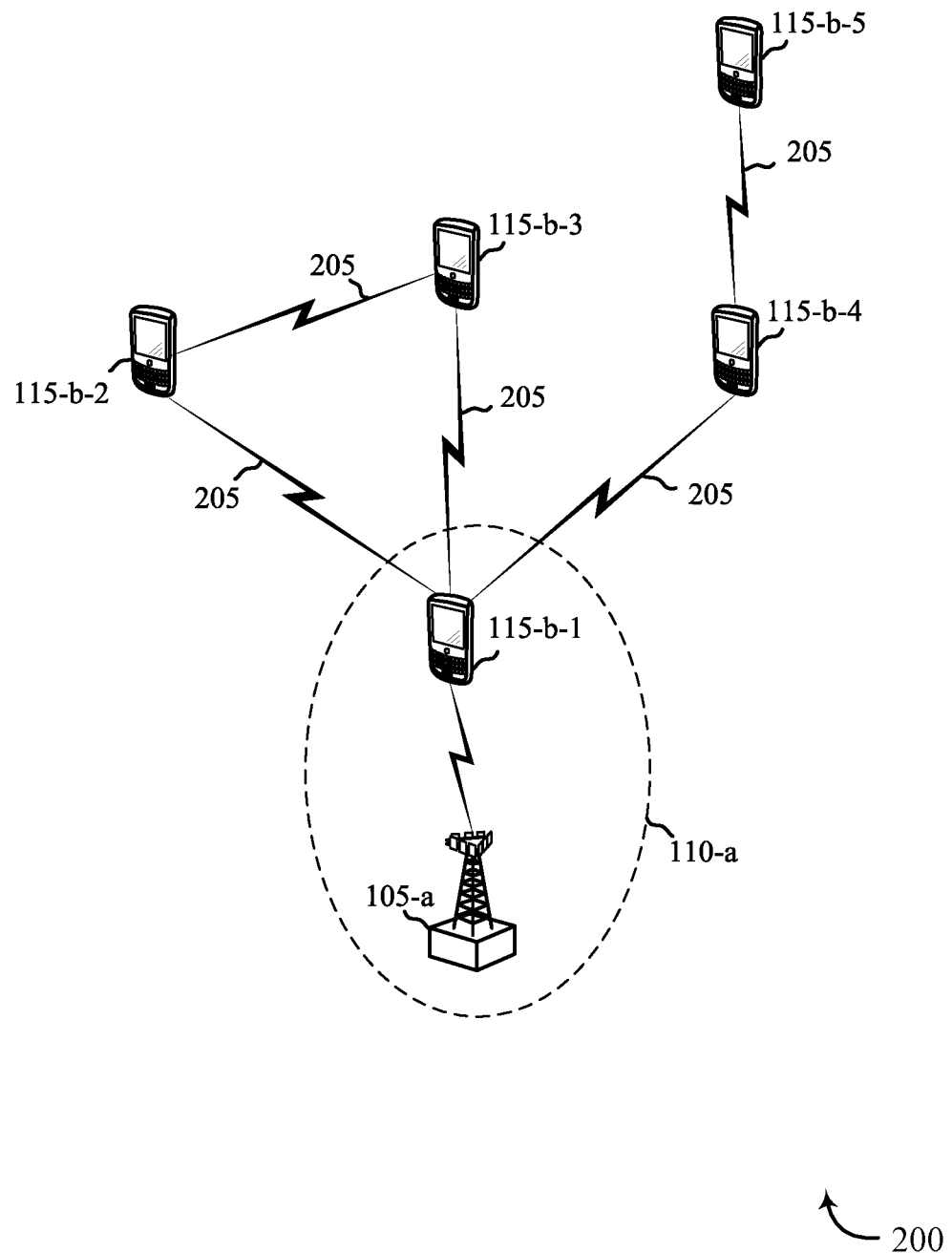
FIG. 2 is a block diagram of an example of an environment in which wireless communications may be managed in accordance with various embodiments.

FIG. 2 is a block diagram of an example of an environment 200 in which the present systems and methods may be implemented. In one configuration, a base station 105-a may communicate with one or more devices that fall within a coverage area 110-a of the base station 105-a. In one example, an in-coverage mobile device 115-b-1 may receive/transmit communications from/to the base station 105-a. One or more mobile devices 115-b-2, 115-b-3, 115-b-4, 115-b-5 may be outside of the coverage area 110-a of the base station 105-a. The base station 105-a and the mobile devices 115-b may be examples of the base stations 105 and mobile devices 115 described with reference to FIG. 1.

In one embodiment, the in-coverage mobile device 115-b-1 may broadcast, multi-cast, or unicast a peer discovery signal 205. The signal 205 may be sent to one or more out-of-coverage UEs. The peer discovery signal 205 may be a Long Term Evolution (LTE) Direct Peer-Discovery Signal. In one configuration, the signal 205 may include an identifier of the in-coverage mobile device 115-b-1. For example, the identifier may be a media access control (MAC) address of the in-coverage mobile device 115-b-1. In addition, the peer discovery signal 205 may include an MBMS relay status of the mobile device 115-b-1. The MBMS relay status may indicate whether the in-coverage mobile device 115-b-1 is capable of providing relay services for one or more out-of-coverage mobile devices 115. The peer discovery signal 205 may further include a portion of service announcement information for an MBMS. The mobile device 115-b-1 may receive service announcement information for one or more MBMS. The device 115-b-1 may select a subset of the service announcement information to include in the peer discovery signal 205.

In one example, an out-of-coverage mobile device may receive peer discovery signals from more than one in-coverage mobile device. The out-of-coverage mobile device may then select one of the in-coverage mobile devices to provide relay services. The determination as to which in-coverage mobile device to select may be based on a signal strength of the peer discovery signal 205 received from the in-coverage mobile devices, the identity of the in-coverage mobile device, the MBMS relay status of the in-coverage mobile device, etc.

In one configuration, the out-of-coverage mobile devices may transmit a peer discovery signal 205 to one or more in-coverage mobile devices 115-b-1. The peer discovery signal may indicate that the out-of-coverage mobile device is out-of-coverage or requesting relay services. The signal may include an identifier of the out-of-coverage mobile device. In one configuration, a mobile device may broadcast a peer discovery signal 205 when it senses that it is about to be out of the coverage area 110-a of the base station 105-a. In another embodiment, a mobile device may broadcast the signal 205 after it is already out of the coverage area 110-a.

In one example, out-of-coverage mobile devices 115-b-2, 115-b-3, may communicate with each other. For example, the mobile devices 115-b-2, 115-b-3 may establish a direct peer-to-peer connection. The in-coverage mobile device 115-b-1 may also provide relay services to one or more out-of-coverage mobile devices. In one configuration, a first out-of-coverage mobile device 115-b-4 may serve as an MBMS relay device for a second out-of-coverage mobile device 115-b-5. The first out-of-coverage mobile device 115-b-4 may transmit a peer discovery signal 205 to inform the second out-of-coverage mobile device 115-b-5 that it (115-b-4) is capable of providing relay services. As another example, the second out-of-coverage mobile device 115-*b*-5 may transmit a signal 205 requesting relay services from the first out-of-coverage mobile device 115-*b*-4. As a result, the in-coverage mobile device 115-*b*-1 may relay communications to/from the base station 105-*a* from/to the first out-of-coverage UE 115-*b*-4. The first out-of-coverage mobile device 115-*b*-4 may relay at least a part of the communications from/to the second out-of-coverage mobile device 115-*b*-5.

Figure 3A:
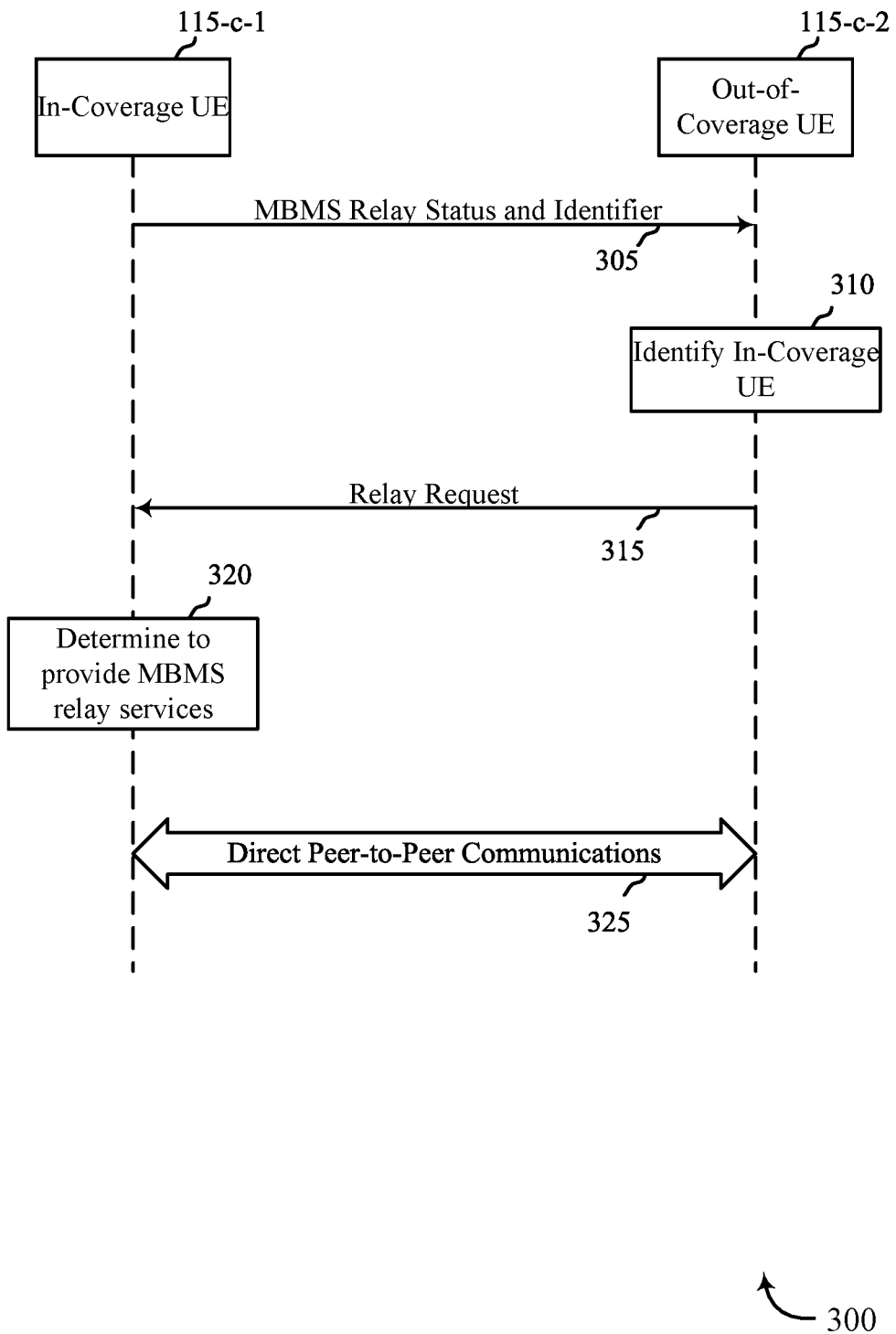
FIGS. 3A and 3B are message flow diagrams illustrating embodiments of communications between a mobile device operating in a coverage area of a base station and a mobile device operating out of the coverage area of the base station, in accordance with various embodiments.

FIG. 3A is a message flow diagram 300 illustrating one embodiment of communications between an in-coverage mobile device 115-*c*-1 and an out-of-coverage mobile device 115-*c*-2. The mobile devices 115-*c* may be examples of the mobile devices described in FIG. 1 and/or 2.

In one configuration, the in-coverage mobile device 115-*c*-1 may transmit MBMS relay status and identifier information 305 to the out-of-coverage mobile device 115-*c*-2. The MBMS relay status may indicate whether the in-coverage mobile device 115-*c*-1 is capable of providing MBMS traffic relay services. In one embodiment, the relay status may indicate whether the in-coverage mobile device 115-*c*-1 has LTE Direct, Wi-Fi Direct, Wi-Fi ad hoc, Bluetooth, and/or other capabilities to provide the relay services. The identifier may be information that serves to identify the in-coverage mobile device 115-*c*-1. The in-coverage mobile device 115-*c*-1 may also transmit a subset of service announcement information for one or more MBMS.

In one example, the MBMS relay status and identifier may be transmitted in response to receiving a peer discovery signal from the out-of-coverage mobile device 115-*c*-2 requesting MBMS relay services. The MBMS relay status and identifier may be transmitted via a peer discovery channel, such as an LTE Direct Peer Discovery Channel.

The out-of-coverage mobile device 115-*c*-2 may analyze the identifier to identify the in-coverage mobile device 310. If the out-of-coverage mobile device 115-*c*-2 receives more than one identifier from different in-coverage mobile devices that indicate they are available to provide relay services, the out-of-coverage mobile device 115-*c*-2 may select one of the in-coverage mobile devices, for example, based on the partial or full service announcement information included in the peer discovery signal received from each in-coverage mobile device. The out-of-coverage mobile device 115-*c*-2 may transmit a relay request 315 to the in-coverage mobile device 115-*c*-1. The request may contain explicit information on the MBMS for which it is requesting MBMS relay service. Upon receiving the request, the in-coverage mobile device 115-*c*-1 may determine whether to provide relay services to this particular out-of-coverage mobile device 115-*c*-2 at block 310. This determination may be based on the available batter power of the in-coverage mobile device 115-*c*-1, the strength of the signal of the relay request, whether the in-coverage mobile device 115-*c*-1 is already providing relay services to another out-of-coverage mobile device, the type of relay services requested by the out-of-coverage mobile device 115-*c*-2, etc. If the in-coverage mobile device 115-*c*-1 determines to provide the relay services, direct peer-to-peer communications 325 may be established between the in-coverage mobile device 115-*c*-1 and the out-of-coverage mobile device 115-*c*-2. The direct peer-to-peer communications 325 may occur in either a point-to-point manner or a point-to-multipoint manner. In other words, the direct peer-to-peer communications 325 may be unicast, multicast, or broadcast communications.

The in-coverage mobile device 115-*c*-1 may retransmit communications to a base station that are received directly from the out-of-coverage mobile device 115-*c*-2. The in-coverage mobile device 115-*c*-1 may also relay communication to the out-of-coverage mobile device 115-*c*-2 that are received from the base station. In one configuration, the in-coverage mobile device 115-*c*-1 may forward communications to other out-of-coverage mobile devices that are directly received from the out-of-coverage mobile devices 115-*c*-2. These other out-of-coverage mobile devices may still be within range of the in-coverage mobile device 115-*c*-1 to receive communications. The in-coverage mobile device 115-*c*-1 may also retransmit communications received from the out-of-coverage mobile device 115-*c*-2 to other in-coverage mobile devices.

Figure 3B:
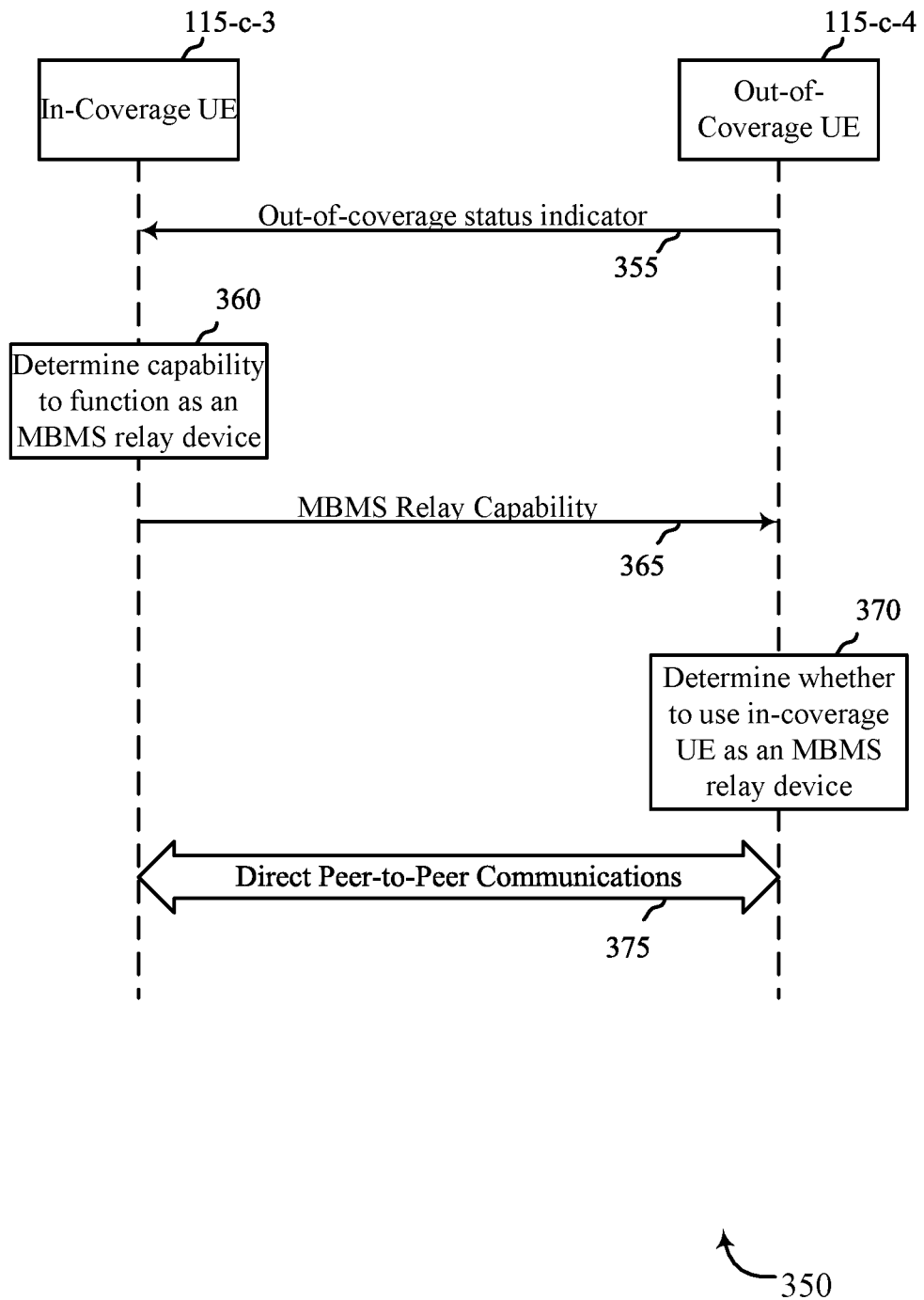

FIG. 3B is a message flow diagram 350 illustrating another embodiment of communications between an in-coverage mobile device 115-*c*-3 and an out-of-coverage mobile device 115-*c*-4. The mobile devices 115-*c* may be examples of the mobile devices described in FIG. 1 and/or 2.

In one configuration, the out-of-coverage mobile device 115-*c*-3 may broadcast an out-of-coverage status indicator 355 or MBMS query to the in-coverage mobile device 115-*c*-3. The out-of-coverage status indicator 355 may indicate a need of the out-of-coverage mobile device 115-*c*-4 for MBMS traffic relay services, and in some cases may indicate a type of MBMS or type of MBMS relay service needed by the out-of-coverage mobile device 115-*c*-4. The out-of-coverage status indicator 355 or MBMS query may be transmitted via a peer discovery channel, such as an LTE-Direct Peer Discovery Channel.

Upon receiving the out-of-coverage status indicator 355, the in-coverage mobile device 115-*c*-3 may determine its capability to function as an MBMS relay device at block 360. This determination may be based on the available battery power of the in-coverage mobile device 115-*c*-3, the strength of the signal of the out-of-coverage status indicator 355 or MBMS query, whether the in-coverage mobile device 115-*c*-3 is already providing MBMS relay services to another out-of-coverage mobile device, the type of MBMS relay services requested by the out-of-coverage mobile device 115-*c*-4, etc. When the in-coverage mobile device 115-*c*-3 is capable of functioning as an MBMS relay device, the in-coverage mobile device 115-*c*-3 may transmit a signal 365 indicating its capability to provide MBMS relay services to the out-of-coverage mobile device 115-*c*-4. The MBMS relay capability signal 365 may also be transmitted via the peer discovery channel.

At block 370, the out-of-coverage mobile device 115-*c*-4 may determine whether to use the in-coverage mobile device 115-*c*-3 as an MBMS relay device. If the out-of-coverage mobile device 115-*c*-4 receives signals indicating that more than one in-coverage mobile device is capable of providing MBMS relay service, the out-of-coverage mobile device 115-*c*-4 may select one of the in-coverage mobile devices for providing MBMS relay service. In some cases, the selection may be based on factors such as the identities of the in-coverage mobile devices, the remaining battery life of each in-coverage mobile device, the type(s) of MBMS supported by each in-coverage mobile device, and/or the radio technology(ies) for which each in-coverage mobile device is willing to provide MBMS relay service. Some or all of these factors may be indicated or derived from peer discovery signals such as the signal 365. Some of the factors may also or alternately be obtained by querying the in-coverage mobile device(s) from which the out-of-coverage mobile device 115-*c*-4 received MBMS relay capability signals.

If the out-of-coverage mobile device 115-*c*-4 decides to obtain MBMS relay services from the in-coverage mobile device 115-*c*-3, direct peer-to-peer communications 375 may be established between the in-coverage mobile device 115-*c*-3 and the out-of-coverage mobile device 115-*c*-4.

The in-coverage mobile device 115-*c*-3 may retransmit communications to a base station that are received directly from the out-of-coverage mobile device 115-*c*-4. The in-coverage mobile device 115-*c*-3 may also relay communications to the out-of-coverage mobile device 115-*c*-4 that are received from the base station.

Figure 4:
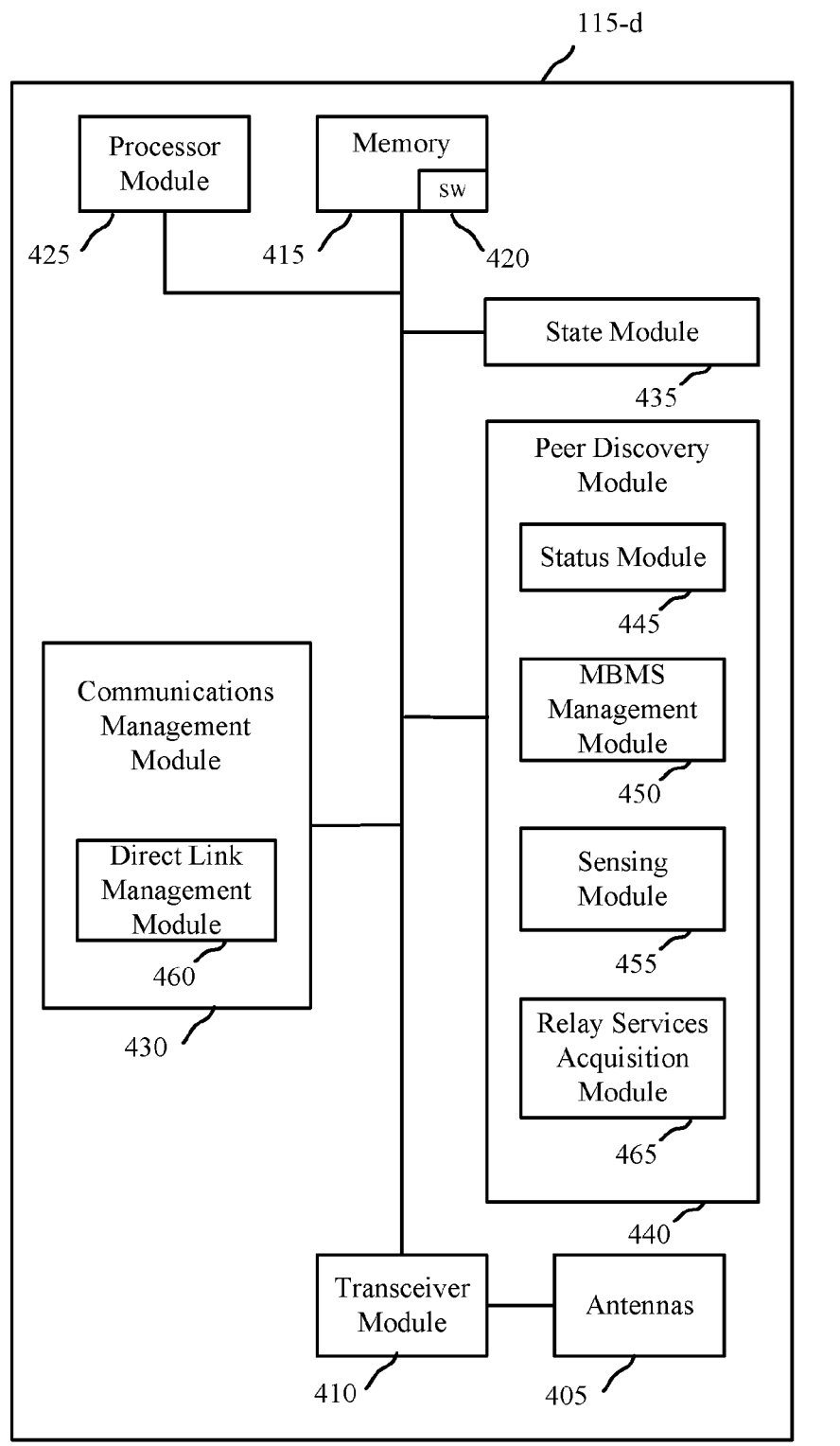
FIG. 4 is a block diagram of an example of a mobile device in accordance with various embodiments.

FIG. 4 is an example of a block diagram 400 of a mobile device 115-*d*. This may be the mobile device 115 of FIGS. 1, 2, and/or 3. The mobile device 115-*d* may have any of various configurations, such as personal computers (e.g., laptop computers, netbook computers, tablet computers, etc.), cellular telephones, PDAs, digital video recorders (DVRs), internet appliances, gaming consoles, e-readers, etc. The mobile device 115-*d* may have an internal power supply (not shown), such as a small battery, to facilitate mobile operation.

The mobile device 115-*d* may include antennas 405, a transceiver module 410, memory 415, and a processor module 425, which each may be in communication, directly or indirectly, with each other (e.g., via one or more buses). The transceiver module 410 may be configured to communicate bi-directionally, via the antennas 405 and/or one or more wired or wireless links, with one or more networks, as described above. For example, the transceiver module 410 may be configured to communicate bi-directionally with one or more of the base stations 105 of FIGS. 1, 2, and/or 3. The transceiver module 410 may also be configured to communicate with one or more other mobile devices 115, either as a relay for the one or more other mobile devices 115, or as a device in need of relaying services from one or more other mobile devices 115. The transceiver module 410 may include a modem configured to modulate packets and provide the modulated packets to the antennas 405 for transmission, and to demodulate packets received from the antennas 405. While the mobile device 115-*d* may include a single antenna, the mobile device 115-*d* will typically include multiple antennas 405 for multiple links.

The memory 415 may include random access memory (RAM) and read-only memory (ROM). The memory 415 may store computer-readable, computer-executable software code 420 containing instructions that are configured to, when executed, cause the processor module 425 to perform various functions (e.g., call processing, database management, message routing, etc.). Alternatively, the software code 420 may not be directly executable by the processor module 425, but may be configured to cause the mobile device 115-*d* (e.g., when compiled and executed) to perform various of the functions described herein.

The processor module 425 may include an intelligent hardware device, e.g., a central processing unit (CPU), a microcontroller, an application specific integrated circuit (ASIC), etc. The processor module 425 may include a speech encoder (not shown) configured to receive audio via a microphone, convert the audio into packets (e.g., 30 ms in length) representative of the received audio, provide the audio packets to the transceiver module 410, and provide indications of whether a user is speaking. Alternatively, an encoder may only provide packets to the transceiver module 410, with the provision or withholding/suppression of the packet itself providing the indication of whether a user is speaking.

According to the architecture of FIG. 4, the mobile device 115-*d* may further include a communications management module 430, a state module 435, and a peer discovery module 440. The communications management module 430 may manage communications with other mobile devices 115. By way of example, the communications management module 430 may be a component of the mobile device 115-*d* in communication with some or all of the other components of the mobile device 115-*d* via a bus. Alternatively, functionality of the communications management module 430 may be implemented as a component of the transceiver module 410, as a computer program product, and/or as one or more controller elements of the processor module 425. The state module 435 may reflect and control the current device state (e.g., context, authentication, base station association, other connectivity issues).

The peer discovery module 440 may identify the mobile device 115-*d* to other mobile devices 115. The peer discovery module 440 may also identify other mobile devices 115, such as 1) mobile devices 115 that are out of the coverage area of a base station 105, which mobile devices 115 may use the mobile device 115 as an MBMS relay device, and/or 2) in-coverage mobile devices 115 that may be capable of providing relaying services to the mobile device 115-*d* when the mobile device 115-*d* is out of the coverage area of a base station 105.

The peer discovery module 440 may include a status module 445, an MBMS management module 450, and/or a sensing module 455. The status module 445 may determine whether the mobile device 115-*d* is capable of functioning as an MBMS relay device and providing relay services. The status module 445 may also determine when the mobile device 115-*d* transitions to (or from) an MBMS relay status. For example, the status module 445 may analyze the available power or bandwidth of the mobile device 115-*d*, whether the mobile device 115-*d* possesses LTE Direct, Wi-Fi Direct, Wi-Fi ad hoc, Bluetooth, and/or other capabilities, etc. Upon determining that it is capable of providing relay services, the status module 445 may transition the status of the mobile device 115-*d* to an MBMS relay status. The mobile device 115-*d* may then broadcast a peer discovery signal 205 indicating a capability of the mobile device 115-*d* to function as an MBMS relay device. An out-of-coverage mobile device 115 may receive the broadcast signal and determine whether to use the mobile device 115-*d* as an MBMS relay device.

In one configuration, the MBMS management module 450 may analyze service announcement information received from a cellular network for at least one MBMS. The module 450 may identify at least a subset of the service announcement information. The identified subset of the MBMS service announcement information may be broadcast to one or more out-of-coverage mobile devices using a peer discovery signal. The mobile device 115-*d* may relay content of the MBMS to the one or more out-of-coverage mobile devices.

The sensing module 455 may sense when the mobile device 115-*d* is about to be out of range of a base station 105. The sensing module 455 may also determine when the mobile device 115-*d* is already out of range of a base station 105. Upon sensing that the mobile device 115-*d* is about to transition out of the coverage area (or has already transitioned out of the coverage area) of a base station 105, the mobile device 115-*d* may broadcast a peer discovery signal 205 to request relay services. One or more mobile devices that are still in the coverage area of a base station 105 may receive the broadcast and determine whether to provide the relay services.

The relay services acquisition module 465 may receive a peer discovery signal from each of at least one MBMS relay device capable of providing MBMS relay services to the mobile device 115-*d*. The relay services acquisition module 465 may then indicate to the direct link management module 460 which of the at least one MBMS relay device should be used to provide MBMS relay services for the mobile device 115-*d*. In some cases, the module 465 may identify a first MBMS relay device for which a peer discovery signal is received as the MBMS relay device to provide MBMS relay services. In other cases, the module 465 may analyze one or more factors to determine whether an MBMS relay device is acceptable to provide MBMS relay services. For example, the module 465 may determine whether a signal strength of a communication with the candidate MBMS relay device exceeds a threshold. In still other cases, the module 465 may perform a comparative analysis on candidate MBMS relay devices, to determine which of the candidate MBMS relay devices is best able to provide MBMS relay services. For example, the module 465 may compare signal strengths of communications with each of the candidate MBMS relay devices, to identify the best signal strength.

The components of the mobile device 115-*d* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the mobile device 115-*d*.

Figure 5:
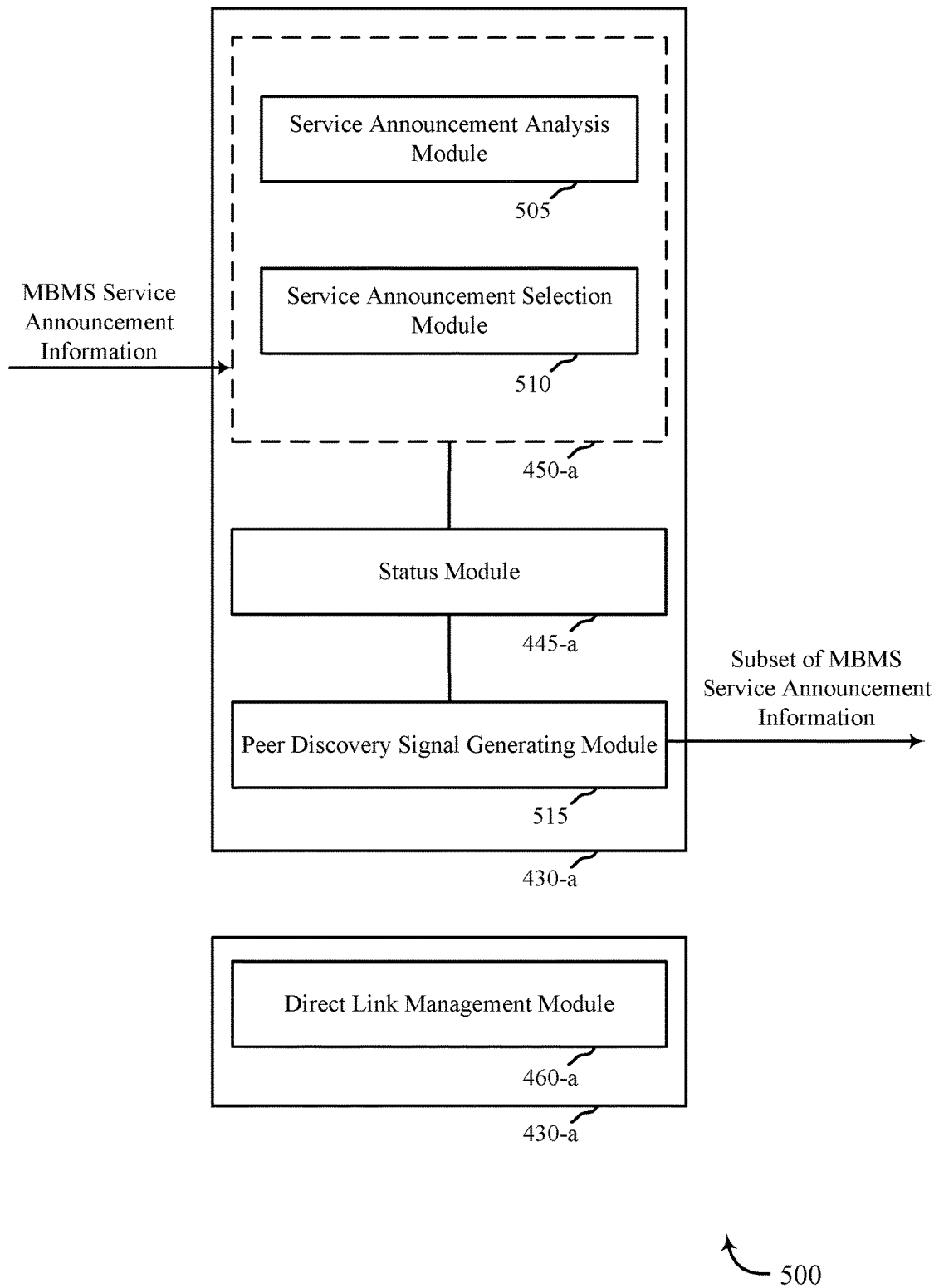
FIG. 5-7 are block diagrams of examples of a peer discovery module in accordance with various embodiments.

FIG. 5 is a block diagram 500 of an example of a peer discovery module 440-*a* and communications management module 430-*a*. In some embodiments, the peer discovery module 440-*a* and communications management module 430-*a* may be examples of one or more aspects of the peer discovery module 440 and communications management module 430 described with reference to FIG. 4.

The peer discovery module 440-*a* may include an MBMS management module 450-*a*, a status module 445-*a*, and/or a peer discovery signal generating module 515. Each of these components may be in communication with each other. In some embodiments, the MBMS management module 450-*a* and/or status module 445-*a* may be examples of one or more aspects of the respective MBMS management module 450 and/or status module 445 described with reference to FIG. 4.

The components of the peer discovery module 440-*a* and communications management module 430-*a* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The MBMS management module 450-*a* may include a service announcement analysis module 505 and/or a service announcement selection module 510. The service announcement analysis module 505-*a* may analyze MBMS service announcement information received for at least one MBMS to determine, for example, various parameters of the at least one MBMS. The parameters for an MBMS may include, for example, parameters indicating the identity of the MBMS and information on how to become a member of the MBMS. Exemplary parameters may also or alternately include an IP multicast address, a source IP address, a service type, a service schedule (e.g., a start and/or stop time), a bitrate, and/or a latency requirement.

The service announcement selection module 510 may identify or select one or more of the received parameters of the at least one MBMS for broadcast to out-of-coverage mobile devices 115. The selected parameters may define a subset of the received service announcement information (e.g., partial or selected service announcement information), which subset is suited for broadcast via a peer discovery signal capable of carrying limited amounts of information.

The status module 445-*a* may determine whether a mobile device 115 is capable of functioning as an MBMS relay device and providing relay services for at least one MBMS. The status module 445-*a* may also determine when the mobile device 115 transitions to (or from) an MBMS relay status. In some cases, the status module 445-*a* may determine whether an available operating power of the mobile device 115 exceeds a threshold. In some cases, the status module 445-*a* may transition the mobile device 115 to the MBMS relay status upon determining that the available operating power of the mobile device 115 exceeds the operating power threshold. Otherwise, the mobile device 115 may be maintained in a non-relay status. In this manner, the status module 445-*a* may determine, for example, whether the mobile device 115 has sufficient operating power to provide for its own functions as well as relay services.

The status module 445-*a* may also determine whether an available transmission bandwidth of the mobile device 115 exceeds a threshold. In some cases, the status module 445-*a* may transition the mobile device 115 to the MBMS relay status upon determining that the available bandwidth of the mobile device 115 exceeds the available bandwidth threshold. Otherwise, the mobile device 115 may be maintained in a non-relay status. In this manner, the status module 445-*a* may ensure, for example, that the mobile device 115 has enough bandwidth to serve its own functions as well as relay services.

The status module 445-*a* may receive information from at least one mobile device 115 operating outside a coverage area of a base station 105 (i.e., from at least one out-of-coverage mobile device 115). In some cases, the information may be received in one or more peer discovery signals broadcast by the at least one out-of-coverage mobile device 115. The information may include, for example, the identity of each out-of-coverage mobile device 115 and/or link quality estimations (e.g., estimations of the quality of one or more links needed to communicate with the at least one out-of-coverage mobile device 115).

In some cases, the determination regarding whether to transition to MBMS relay status may also or alternately be based on one or more parameters or conditions, such as: the number of out-of-coverage mobile devices 115 in proximity to the device considering a transition to MBMS relay status; received or determined link quality estimations; and/or the existence of at least one MBMS and/or the existence of a particular MBMS or particular type of MBMS. Typically, the status module 445-a may be programmed to allocate resources for its device's core or mission functions before allocating resources for relay services. In some cases, however, the device's core or mission functions may include relay services, in which case a higher priority may be given to allocating resources for relay services.

In some cases, link quality estimations may be used by the status module 445-a to derive expected peer-to-peer (i.e., device-to-device) broadcast or unicast data rates of expected transmissions. The expected data rates may be taken into account by the status module 445-a when determining whether to transition to MBMS relay status.

The status module 445-a may further determine whether to transition to MBMS relay status or provide relay services for at least one MBMS based on one or more identified parameters of the at least one MBMS. For example, the status module 445-a may identify a Quality of Service (QoS) requirement (e.g., a latency requirement) of an MBMS and determine whether it has enough available bandwidth to meet the QoS requirement. By way of further example, the status module 445-a may also (or alternately) identify the service schedule for an MBMS and determine whether it can satisfy the service schedule of the MBMS. In some cases, the status module 445-a may determine that it is unable to provide relay services for one or more MBMS because its device is unable to fulfill the requirements of the MBMS (e.g., if the data rate of a high-quality MP4 video streaming MBMS exceeds a maximum peer-to-peer broadcast or unicast data rate of a link, the status module 445-a may determine 1) not to transition to MBMS relay status, or 2) not to provide relay service for the particular MBMS).

The status module 445-a may in some cases analyze additional or alternative factors when determining a capability to provide relay services. For example, the status module 445-a may determine whether the mobile device 115 possesses LTE Direct capabilities.

In some embodiments, the status module 445-a may determine whether to transition the mobile device 115 to an MBMS relay status periodically or upon a triggering event. In some cases, the triggering event may be a receipt, by the mobile device 115, of MBMS service announcement information or an out-of-coverage status indicator or MBMS query broadcast by an out-of-coverage mobile device 115. Upon receiving such information or signals, the status module 445-a may determine whether its device is able to transition to an MBMS relay status and provide MBMS relay services.

In cases where the status module 445-a transitions a device to MBMS relay status, the peer discovery signal generating module 515 may broadcast a peer discovery signal that: indicates the identity of the broadcast device; indicates the broadcasting device's MBMS relay status (i.e., the capability of the mobile device 115 to function as an MBMS relay device); and includes at least a subset of received MBMS service announcement information. An out-of-coverage mobile device 115 may receive the peer discovery signal and determine whether to use the broadcasting device as an MBMS relay device.

The direct link management module 460-a of the communications management module 430-a may facilitate the establishment of a direct link (e.g., a peer-to-peer link) with a mobile device 115 in need of MBMS relay services (i.e., at least one other mobile device 115). Thereafter, the mobile device 115 in which the peer discovery module 440-a and communications management module 430-a are implemented may receive and retransmit at least one MBMS transmission (e.g., at least one multicast stream) from a base station 105 to the mobile device 115 in need of MBMS relay services.

Figure 6:
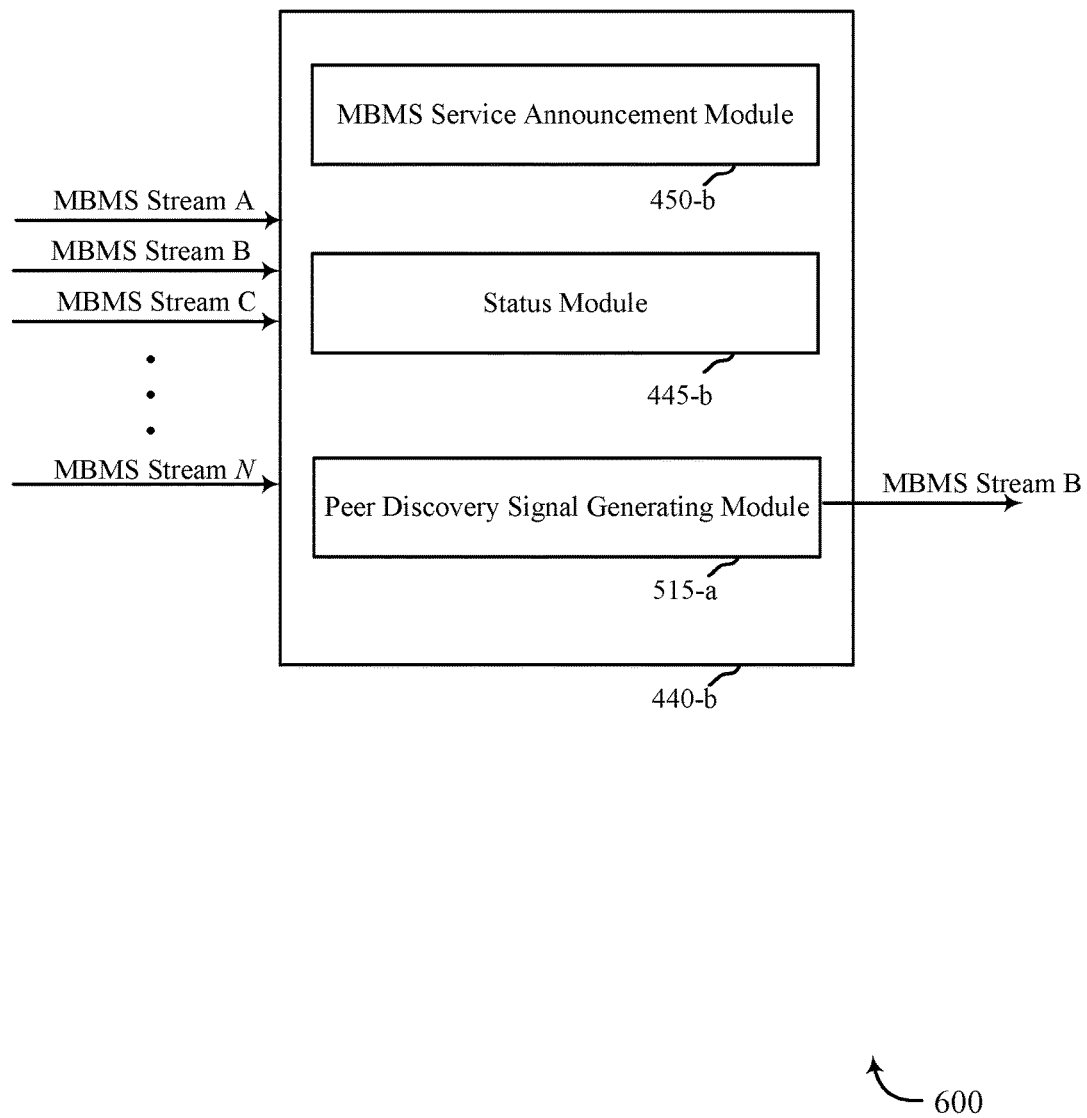

FIG. 6 is a block diagram 600 of an example of a peer discovery module 440-b. In some embodiments, the peer discovery module 440-b may be an example of one or more aspects of the peer discovery module 440 described with reference to FIG. 4 and/or 5. The peer discovery module 440-b may include an MBMS management module 450-b, a status module 445-b, and/or a peer discovery signal generating module 515-a. Each of these components may be in communication with each other. In some embodiments, each of the modules 450-b, 445-b, 515-a may be an example of one or more aspects of the similarly named modules described with reference to FIG. 4 and/or 5.

The components of the peer discovery module 440-b may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

FIG. 6 shows that the peer discovery module 440-b may receive content for a plurality of MBMS (e.g., MBMS streams A through N), but relay only a selected one or more of the streams (e.g., MBMS stream B). Streams may be selected for relaying based on a received request or requests of at least one out-of-coverage mobile device 115 desiring to receive the content associated with a selected one or more MBMS.

Figure 7:
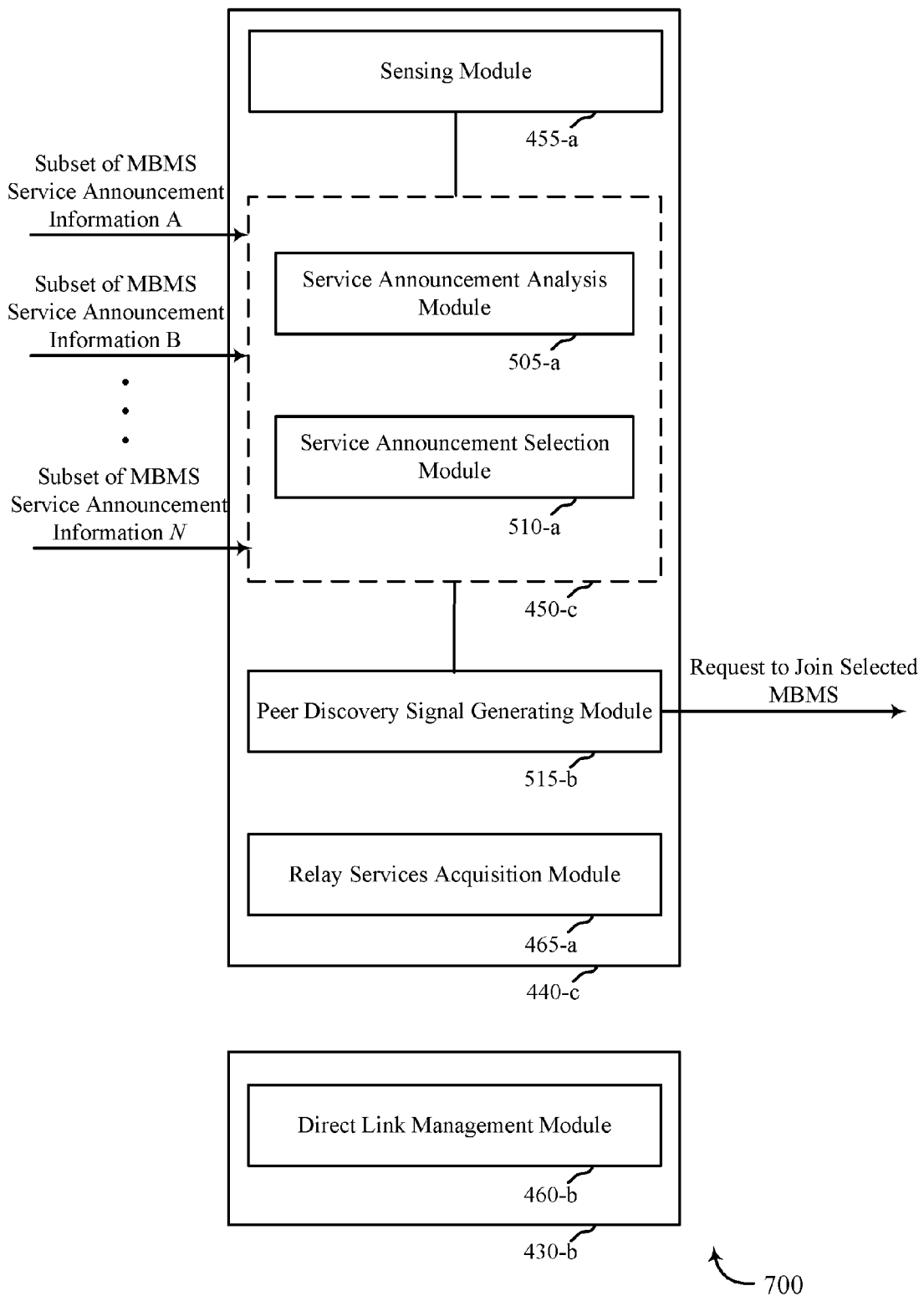

FIG. 7 is a block diagram 700 of an example of a peer discovery module 440-c and a communications management module 430-b. In some embodiments, the peer discovery module 440-c and communications management module 430-b may be examples of one or more aspects of the peer discovery module 440 and communications management module 430 described with reference to FIG. 4. The peer discovery module 440-c may include an MBMS management module 450-c, a sensing module 455-c, a peer discovery signal generating module 515-b, and/or a relay services acquisition module 465-a. Each of these components may be in communication with each other. In some embodiments, each of the modules 450-c, 445-c, 515-b, 465-a may be an example of one or more aspects of the similarly named modules described with reference to FIG. 4, 5, and/or 6.

The components of the peer discovery module 440-c and the communications management module 430-b may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

FIG. 7 shows that the peer discovery module 440-*c*, when residing in an out-of-coverage mobile device 115, may receive subsets of MBMS service announcement information for a plurality of MBMS (e.g., MBMS streams A through N) from a number of peer discovery signals sent by a number of in-coverage mobile devices. The subsets of service announcement information may be received by the MBMS management module 450-*c* and analyzed by the service announcement analysis module 505-*a*. For example, the service announcement information may be analyzed to determine whether a particular MBMS is available from a device that transmitted the service announcement information. Peer discovery signals in which the subsets of service announcement information are received may also be analyzed. For example, the strengths of the peer discovery signals may be analyzed to determine which of a number of candidate MBMS relay devices can best provide an MBMS (e.g., based on the signal strength of a peer discovery signal exceeding a threshold and/or the peer discovery signal being the strongest of the received peer discovery signals associated with a particular MBMS). The service announcement selection module 510-*a* may then select an MBMS based on the partial or full service announcement information included in the peer discovery signal received from each in-coverage mobile device, and the MBMS relay device that can best provide the MBMS. The peer discovery signal generating module 515-*b* may transmit a request to join the selected MBMS. The request may in some cases be transmitted in a peer discovery signal, and may contain explicit information on the MBMS for which the out-of-coverage mobile device 115 is requesting MBMS relay service.

The relay services acquisition module 465-*a* may receive a peer discovery signal from each of at least one MBMS relay device capable of providing MBMS relay services to the mobile device in which the modules 440-*c*, 430-*b* are located. The relay services acquisition module 465-*a* may then indicate to the direct link management module 460-*b* which of the at least one MBMS relay device should be used to provide MBMS relay services for the mobile device in which the modules 440-*c*, 430-*b* are located. In some cases, the module 465-*a* may identify a first MBMS relay device for which a peer discovery signal is received as the MBMS relay device to provide MBMS relay services. In other cases, the module 465-*a* may analyze one or more factors to determine whether an MBMS relay device is acceptable to provide MBMS relay services. For example, the module 465-*a* may determine whether a signal strength of a communication with the candidate MBMS relay device exceeds a threshold. In still other cases, the module 465-*a* may perform a comparative analysis on candidate MBMS relay devices, to determine which of the candidate MBMS relay devices is best able to provide MBMS relay services. For example, the module 465-*a* may compare signal strengths of communications with each of the candidate MBMS relay devices, to identify the best signal strength.

Figure 8:
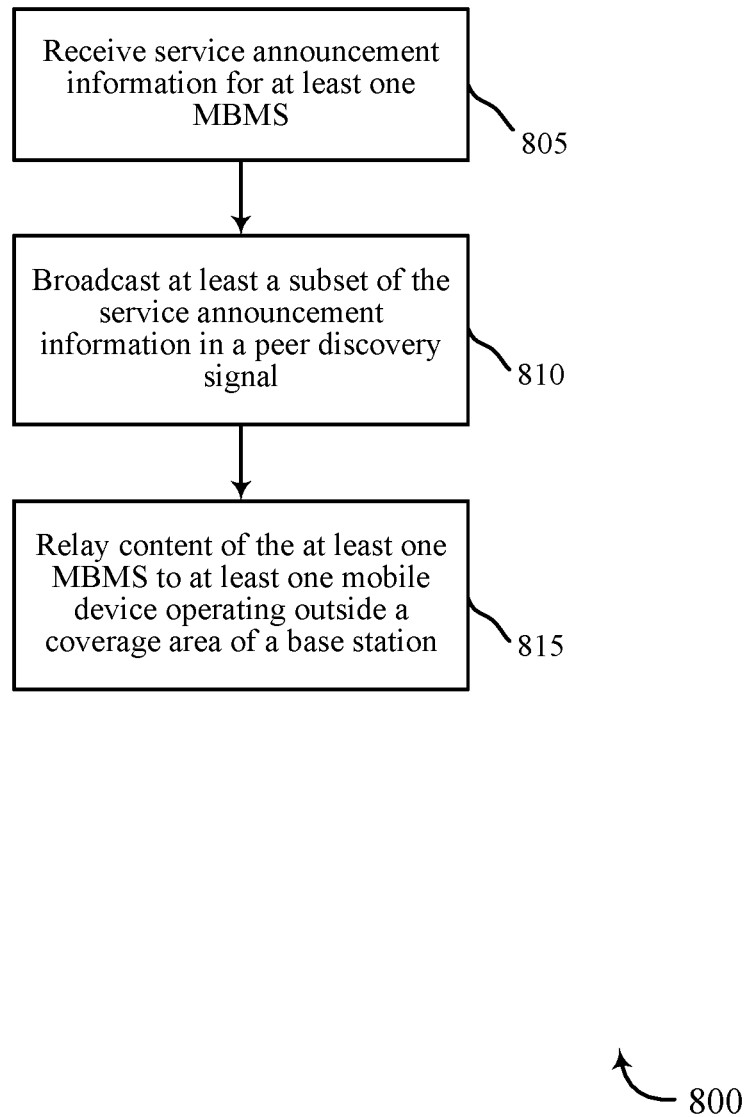
FIGS. 8-11 are flowcharts of various methods for managing an MBMS in accordance with various embodiments.

FIG. 8 is a flow chart illustrating one embodiment of a method 800 for managing an MBMS. For clarity, the method 800 is described below with reference to aspects of one or more of the mobile devices 115 described with reference to FIGS. 1, 2, 3, and/or 4, and/or the peer discovery module 440 described with reference to FIGS. 4, 5, 6, and/or 7. In some implementations, the peer discovery module 440 may execute one or more sets of codes to control the functional elements of a mobile device 115 to perform the functions described below.

At block 805, service announcement information may be received for at least one MBMS. The service announcement information may be received at a device or UE which, in some cases, may be a mobile device 115. In some embodiments, the service announcement information may be received using the peer discovery module 440 and/or MBMS management module 450 described with reference to FIGS. 4, 5, 6, and/or 7.

At block 810, at least a subset of the service announcement information may be broadcast (e.g., from the device or UE at which it is received at block 805) in a peer discovery signal. In some embodiments, the peer discovery signal may be broadcast using the peer discovery module 440 described with reference to FIGS. 4, 5, 6, and/or 7, and/or the peer discovery signal generating module 515 described with reference to FIGS. 5, 6, and/or 7.

At block 815, content of the at least one MBMS may be relayed (e.g., from the device or UE) to at least one mobile device 115 operating outside a coverage area of a base station. In some embodiments, the content may be relayed using the communications management module 430 and/or the direct link management module 460 described with reference to FIGS. 4, 5, 6, and/or 7.

Therefore, the method 800 may be used for managing an MBMS. It should be noted that the method 800 is just one implementation and that the operations of the method 800 may be rearranged or otherwise modified such that other implementations are possible.

Figure 9:
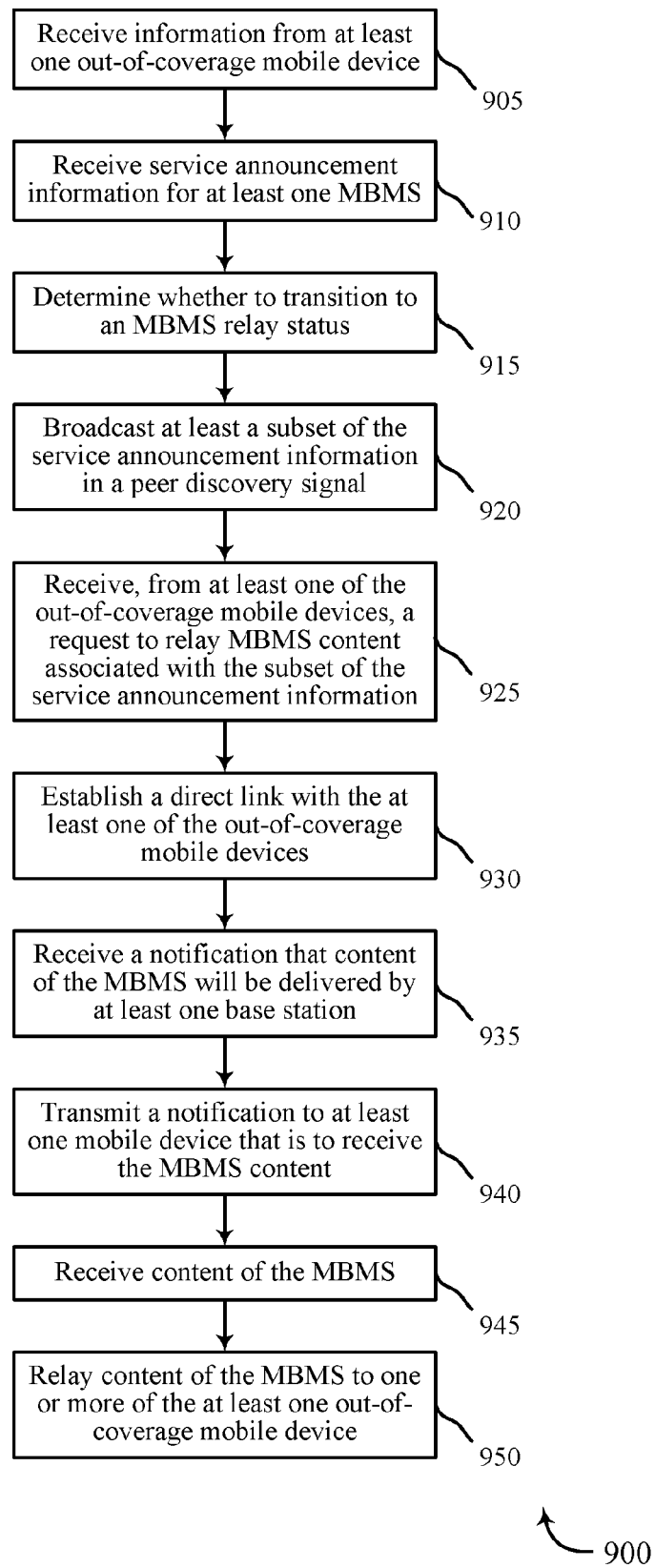

FIG. 9 is a flow chart illustrating another embodiment of a method 900 for managing an MBMS. For clarity, the method 900 is described below with reference to aspects of one or more of the mobile devices 115 described with reference to FIGS. 1, 2, 3, and/or 4, and/or the peer discovery module 440 described with reference to FIGS. 4, 5, 6, and/or 7. In some implementations, the peer discovery module 440 may execute one or more sets of codes to control the functional elements of a mobile device 115 to perform the functions described below.

At block 905, information may be received from at least one mobile device 115 operating outside a coverage area of a base station 105 (i.e., from at least one out-of-coverage mobile device 115). The information may be received at a device or UE which, in some cases, may be a mobile device 115. In some cases, the information may be received in one or more peer discovery signals broadcast by the at least one out-of-coverage mobile device 115. The peer discovery signals may be broadcast periodically or upon the occurrence of one or more events (e.g., upon a mobile device 115 leaving the coverage area of a base station 105, or upon a mobile device 115 determining it may be about to lose coverage). The information may include, for example, the identity of each out-of-coverage mobile device 115 and/or link quality estimations (e.g., estimations of the quality of one or more links needed to communicate with the at least one out-of-coverage mobile device 115).

The device which receives the information from the at least one out-of-coverage mobile device 115 may operate within the coverage area of the base station 105, or may be in communication with one or more MBMS relay devices, at least one of which operates within the coverage area of the base station 105. In some embodiments, the information received from the at least one mobile device 115 operating outside the coverage area of the base station 105 may be received using the peer discovery module 440 and/or status module 445 described with reference to FIGS. 4, 5, 6, and/or 7.

At block 910, service announcement information may be received for at least one MBMS. The service announcement information may be received from the base station 105, and in some cases may be received via one or more MBMS relay devices. In some embodiments, the service announcement information may be received using the peer discovery module 440 and/or MBMS management module 450 described with reference to FIGS. 4, 5, 6, and/or 7.

The received service announcement information may include one or more parameters of the at least one MBMS. The parameters for an MBMS may include, for example, parameters indicating the identity of the MBMS and information on how to become a member of the MBMS. Exemplary parameters may also or alternately include an IP multicast address, a source IP address, a service type, a service schedule (e.g., a start and/or stop time), a bitrate, and/or a latency requirement.

At block 915, a determination regarding whether to transition to an MBMS relay status may be made. The MBMS relay status may indicate a capability of a device to function as an MBMS relay device and relay content of at least one MBMS.

In some cases, the determination regarding whether to transition to MBMS relay status may be based on one or more parameters or conditions, such as: the number of out-of-coverage mobile devices 115 in proximity to the device considering a transition to MBMS relay status; received or determined link quality estimations; the existence of at least one MBMS and/or the existence of a particular MBMS or particular type of MBMS; and/or the capability of the device to relay data for some or all of the MBMS for which service announcement information is received. The capability of the device to relay some or all of the MBMS may be based, for example, on the available operating power of the device, the available bandwidth of the device, and/or other factors. Typically, the device may be programmed to allocate resources for its core or mission functions before allocating resources for relay services. In some cases, however, the device's core or mission functions may include relay services, in which case a higher priority may be given to allocating resources for relay services.

In some cases, link quality estimations may be used to derive expected peer-to-peer (i.e., device-to-device) broadcast or unicast data rates of transmissions expected to be made by a candidate MBMS relay device or at least one out-of-coverage mobile device. The expected data rates may be taken into account when determining whether to transition to MBMS relay status.

A device may further determine whether to transition to MBMS relay status or provide relay services for at least one MBMS based on one or more identified parameters of the at least one MBMS. For example, the device may identify a Quality of Service (QoS) requirement (e.g., a latency requirement) of an MBMS and determine whether it has enough available bandwidth to meet the QoS requirement. By way of further example, the device may also (or alternately) identify the service schedule for an MBMS and determine whether it can satisfy the service schedule of the MBMS. In some cases, the device may determine that it is unable to provide relay services for one or more MBMS because it is unable to fulfill the requirements of the MBMS (e.g., if the data rate of a high-quality MP4 video streaming MBMS exceeds a maximum peer-to-peer broadcast or unicast data rate of a link, the device may determine 1) not to transition to MBMS relay status, or 2) not to provide relay service for the particular MBMS).

In some embodiments, the determination to transition to MBMS relay status may be made using the peer discovery module 440 and/or status module 445 described with reference to FIGS. 4, 5, 6, and/or 7.

At block 920, at least a subset of the service announcement information may be broadcast in a peer discovery signal. In some cases, the at least a subset of service announcement information may be selected based on a device's capability to relay data for a particular MBMS. Identification information (e.g., information identifying the device capable of functioning as an MBMS relay device for MBMS) and/or the MBMS relay status of the device may also be broadcast in the peer discovery signal. Although it may be feasible, in some cases, to broadcast all received service announcement information, the amount of information that may be broadcast in a peer discovery signal may be limited. In these cases, only some of the received service announcement information (i.e., partial or selected service announcement information) may be broadcast. For example, only certain parameters of the received service announcement information may be broadcast. An out-of-coverage mobile device 115 may then request the remaining service announcement information when needed.

In some cases, only an announcement that MBMS service announcement information has been received may be broadcast in a peer discovery signal. An out-of-coverage mobile device 115 may then request the MBMS service announcement information, if interested. The out-of-coverage mobile device 115 may request the MBMS service announcement information by transmitting a request to a particular MBMS relay device, or by broadcasting a request to all MBMS relay devices that may have service announcement information.

In some embodiments, the peer discovery signal may be broadcast using the peer discovery module 440 described with reference to FIGS. 4, 5, 6, and/or 7, and/or the peer discovery signal generating module 515 described with reference to FIGS. 5, 6, and/or 7.

At block 925, a request for relaying service may be received from another mobile device 115 (e.g., from one of the at least one mobile device 115 operating outside the coverage area of the base station 105). In some embodiments, the request may be received using the peer discovery module 440 described with reference to FIGS. 4, 5, 6, and/or 7.

At block 930, a direct link (e.g., a peer-to-peer link) may be established with one or more of the at least one out-of-coverage mobile device 115. In some cases, the direct link may be a point-to-point link. In other cases, the direct link may be part of a point-to-multipoint link. In some embodiments, the direct link may be established using the communications management module 430 and/or the direct link management module 460 described with reference to FIGS. 4, 5, 6, and/or 7.

At block 935, a notification that content of the at least one MBMS will be delivered by the base station 105 may be received (e.g., at the device performing the method 900).

At block 940, and upon receiving the notification that content of the at least one MBMS will be delivered, a notification may be transmitted to at least the out-of-coverage mobile device(s) 115 that requested the at least one MBMS.

At block 945, content of the at least one MBMS may be received (e.g., at the device performing the method 900). The content may include at least one multicast stream of the at least one MBMS.

At block 950, the received content of the at least one MBMS may be relayed to the out-of-coverage mobile device(s) that requested the at least one MBMS. The relaying may include, for example, retransmitting at least one multicast stream of the at least one MBMS to the out-of-coverage mobile device(s). In some cases, the content may be relayed via the direct link(s) established at block 930 (e.g., via one or more point-to-point and/or point-to-multipoint links). In some embodiments, the content may be relayed using the peer discovery module 440 and/or the direct link management module 460 described with reference to FIG. 4.

Therefore, the method 900 may be used for managing an MBMS. It should be noted that the method 900 is just one implementation and that the operations of the method 900 may be rearranged or otherwise modified such that other implementations are possible.

Figure 10:
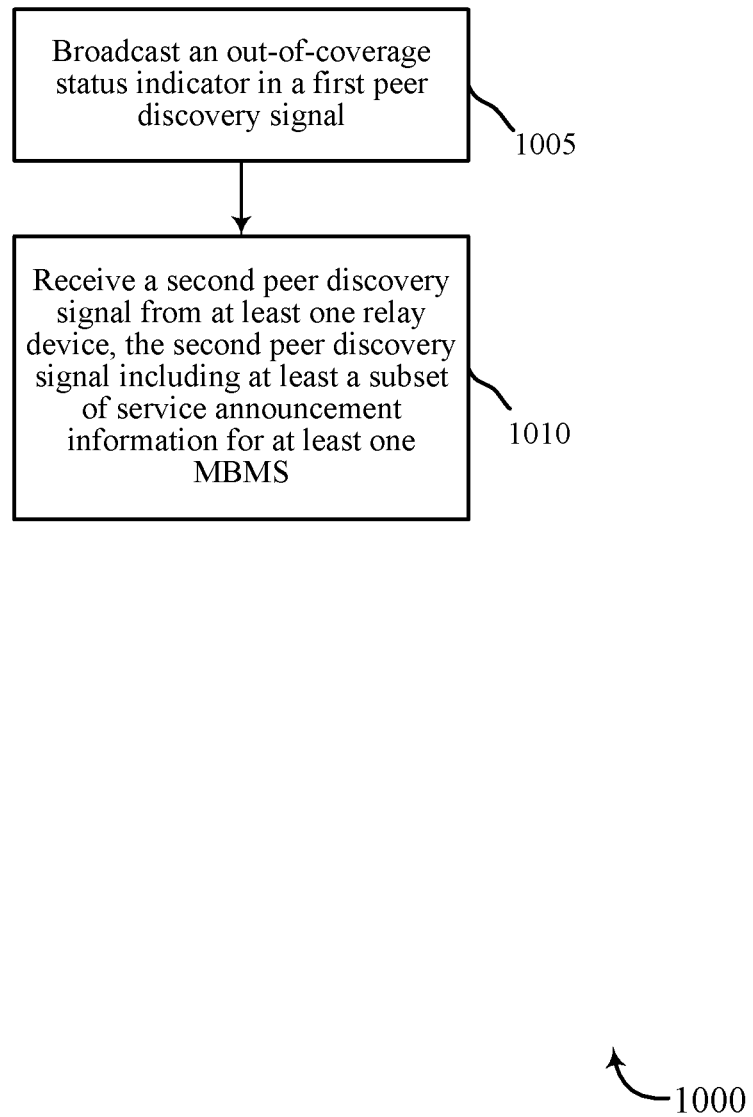

FIG. 10 is a flow chart illustrating one embodiment of a method 1000 for managing an MBMS. For clarity, the method 1000 is described below with reference to aspects of one or more of the mobile devices 115 described with reference to FIGS. 1, 2, 3, and/or 4, and/or the peer discovery module 440 described with reference to FIGS. 4, 5, 6, and/or 7. In some implementations, the peer discovery module 440 may execute one or more sets of codes to control the functional elements of a mobile device 115 to perform the functions described below.

At block 1005, an out-of-coverage status indicator or MBMS query (e.g., a request to relay MBMS content) may be broadcast in a first peer discovery signal. The out-of-coverage status indicator or MBMS query may in some cases be broadcast by a mobile device 115, and may indicate a need of the mobile device 115 for relay service to/from a base station 105 and/or a desire of the mobile device 115 to receive (or maintain) at least one MBMS. In some embodiments, the signal may be broadcast using the peer discovery module 440 described with reference to FIGS. 4, 5, 6, and/or 7, and/or the peer discovery signal generating module 515 described with reference to FIGS. 5, 6, and/or 7.

At block 1010, a second peer discovery signal may be received from at least one MBMS relay device. The second peer discovery signal may include at least a subset of service announcement information for at least one MBMS. The second peer discovery signal may also indicate a capability of the at least one other mobile device 115 to function as an MBMS relay device (e.g., a peer discovery signal may be received from each of the at least one other mobile device 115 and each peer discovery signal may indicate whether a respective one of the at least one other mobile device 115 is capable of functioning as an MBMS relay device).

In some cases, the mobile device 115 may operate outside a coverage area of a base station 105, and the at least one other mobile device 115 may operate within the coverage area of the base station 105. Alternately, one or more of the other mobile devices 115 may serve as MBMS relay devices for their respective base station(s) 105.

In some embodiments, the operations at block 1010 may be performed using the peer discovery module 440 described with reference to FIGS. 4, 5, 6, and/or 7, and/or the relay services acquisition module 465 described with reference to FIG. 4.

Therefore, the method 1000 may be used for managing an MBMS. It should be noted that the method 1000 is just one implementation and that the operations of the method 1000 may be rearranged or otherwise modified such that other implementations are possible.

Figure 11:
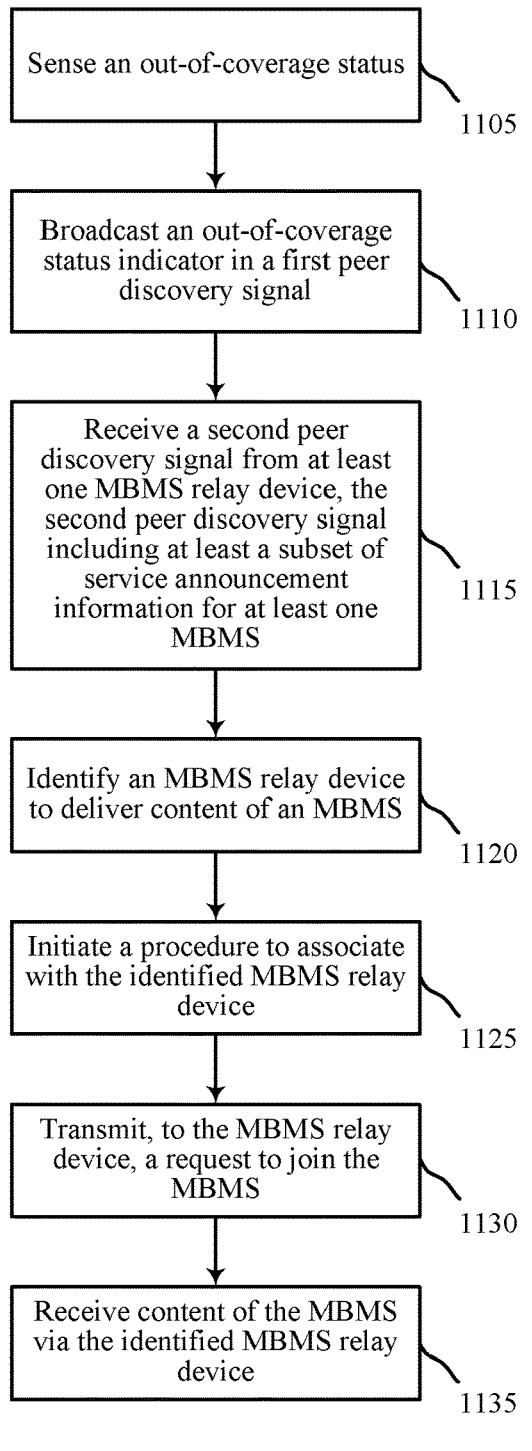

FIG. 11 is a flow chart illustrating one embodiment of a method 1100 for managing an MBMS. For clarity, the method 1100 is described below with reference to aspects of one or more of the mobile devices 115 described with reference to FIGS. 1, 2, 3, and/or 4, and/or the peer discovery module 440 described with reference to FIGS. 4, 5, 6, and/or 7. In some implementations, the peer discovery module 440 may execute one or more sets of codes to control the functional elements of a mobile device 115 to perform the functions described below.

At block 1105, a mobile device 115 may sense an out-of-coverage status. In some cases, the out-of-coverage status may be sensed upon (or subsequent to) operating outside a coverage area of a base station 105. In other cases, the out-of-coverage status may be sensed prior to operating outside the coverage area of the base station 105 (e.g., the mobile device 115 may determine based on failing signal strength and/or other factors that it is exiting the coverage area of the base station 105). In some embodiments, the out-of-coverage status may be sensed using the peer discovery module 440 and/or the sensing module 455, as described with reference to FIG. 4.

At block 1110, an out-of-coverage status indicator or MBMS query (e.g., a request to relay MBMS content) may be broadcast in a first peer discovery signal. The out-of-coverage status indicator or MBMS query may in some cases be broadcast by a mobile device 115, and may indicate a need of the mobile device 115 for relay service to/from a base station 105 and/or a desire of the mobile device 115 to receive (or maintain) at least one MBMS. In some embodiments, the signal may be broadcast using the peer discovery module 440 described with reference to FIGS. 4, 5, 6, and/or 7, and/or the peer discovery signal generating module 515 described with reference to FIGS. 5, 6, and/or 7.

At block 1115, a second peer discovery signal may be received from at least one MBMS relay device. The second peer discovery signal may include at least a subset of service announcement information for at least one MBMS. The second peer discovery signal may also indicate a capability of the at least one other mobile device 115 to function as an MBMS relay device (e.g., a peer discovery signal may be received from each of the at least one other mobile device 115 and each peer discovery signal may indicate whether a respective one of the at least one other mobile device 115 is capable of functioning as an MBMS relay device).

In some cases, the mobile device 115 may operate outside a coverage area of a base station 105, and the at least one other mobile device 115 may operate within the coverage area of the base station 105. Alternately, one or more of the other mobile devices 115 may serve as MBMS relay devices for their respective base station(s) 105.

In some embodiments, the operations at block 1115 may be performed using the peer discovery module 440 described with reference to FIGS. 4, 5, 6, and/or 7, and/or the relay services acquisition module 465 described with reference to FIG. 4.

At block 1120, an MBMS relay device to deliver content of an MBMS may be identified. The MBMS relay device may be identified, for example, by analyzing each of the at least one second peer discovery signal to determine whether a particular MBMS is available from the device that transmitted the peer discovery signal, and analyzing factors such as signal strengths of the received peer discovery signals to determine which of a number of candidate MBMS relay devices can best provide the MBMS (e.g., based on the signal strength of a peer discovery signal exceeding a threshold and/or the peer discovery signal being the strongest of the received peer discovery signals).

At block 1125, a procedure to associate with the identified MBMS relay device may be initiated. The procedure may result in the establishment of a direct link (e.g., a peer-to-peer link) with the identified MBMS relay device. In some cases, the direct link may be a point-to-point link. In other cases, the direct link may be part of a point-to-multipoint link in which the mobile device 115 is one of the multiple points served by a common MBMS relay device. In some embodiments, the direct link may be established using the communications management module 430 and/or the direct link management module 460 described with reference to FIG. 4.

At block 1130, a request to join a particular MBMS may be transmitted to the identified MBMS relay device. The request may include an IGMP/MLD join message to the IP address of its targeted MBMS. The request may be relayed from the MBMS relay device to a core network. A device and/or application of the core network may then determine whether the mobile device 115 is an authorized subscriber of, or qualified to join, the particular MBMS.

Assuming that the mobile device 115 is a subscriber of, or qualified to join, the particular MBMS, content of the particular MBMS (or content of multiple MBMS) may be received via the identified MBMS relay device at block 1135.

In some cases, an out-of-coverage mobile device 115 that has joined an MBMS may broadcast content addressed to one or more subscribers of an MBMS. In such cases, the content may be relayed to a network server by the identified MBMS relay device (e.g., via an uplink from the mobile device 115 to the MBMS relay device) for distribution to the one or more subscribers.

Therefore, the method 1100 may be used for managing an MBMS. It should be noted that the method 1100 is just one implementation and that the operations of the method 1100 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1× EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. At the Physical layer, the transport channels may be mapped to Physical channels.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote light source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for managing a multimedia broadcast multicast service (MBMS), comprising:
   broadcasting an out-of-coverage status indicator or MBMS query in a first peer discovery signal;
   receiving a second peer discovery signal from each of a plurality of MBMS relay devices, each second peer discovery signal comprising at least a subset of service announcement information for at least one MBMS; and
   selecting an MBMS relay device from the plurality of MBMS relay devices to deliver content of a particular MBMS based at least in part on a signal strength of the second peer discovery signal from each MBMS relay device.

2. The method of claim 1, further comprising:
   initiating a procedure to associate with the selected MBMS relay device.

3. The method of claim 2, wherein the procedure to associate with the selected MBMS relay device comprises:
   transmitting a request to join the particular MBMS to the selected MBMS relay device, the request being relayed from the selected MBMS relay device to a core network.

4. The method of claim 1, further comprising:
   broadcasting content addressed to one or more subscribers to an MBMS, the content being relayed to a network server by at least one of the plurality of MBMS relay devices for distribution to the one or more subscribers to the MBMS.

5. An apparatus for managing a multimedia broadcast multicast service (MBMS), comprising:
   means for broadcasting an out-of-coverage status indicator or MBMS query in a first peer discovery signal;
   means for receiving a second peer discovery signal from each of a plurality of MBMS relay devices, each second peer discovery signal comprising at least a subset of service announcement information for at least one MBMS; and
   means for selecting an MBMS relay device from the plurality of MBMS relay devices to deliver content of a particular MBMS based at least in part on a signal strength of the second peer discovery signal from each MBMS relay device.

6. The apparatus of claim 5, further comprising:
   means for initiating a procedure to associate with the selected MBMS relay device.

7. The apparatus of claim 6, wherein the means for initiating the procedure to associate with the selected MBMS relay device comprises:
   means for transmitting a request to join the particular MBMS to the selected MBMS relay device, the request being relayed from the selected MBMS relay device to a core network.

8. The apparatus of claim 5, further comprising:
   means for broadcasting content addressed to one or more subscribers to an MBMS, the content being relayed to a network server by at least one of the plurality of MBMS relay device for distribution to the one or more subscribers to the MBMS.

9. An apparatus for managing a multimedia broadcast multicast service (MBMS), comprising:
   a processor;
   memory in electronic communication with the processor; and
   instructions stored in the memory, the instructions being executable by the processor to:
   broadcast an out-of-coverage status indicator with an MBMS query in a first peer discovery signal;
   receive a second peer discovery signal from each of a plurality of MBMS relay devices, each second peer discovery signal comprising at least a subset of service announcement information for at least one MBMS; and
   select an MBMS relay device from the plurality of MBMS relay devices to deliver content of a particular MBMS based at least in part on a signal strength of the second peer discovery signal from each MBMS relay device.

10. The apparatus of claim 9, wherein the instructions are executable by the processor to:
    initiate a procedure to associate with the selected MBMS relay device.

11. The apparatus of claim 10, wherein the instructions to initiate the procedure to associate with the selected MBMS relay device comprise:

instructions to transmit a request to join the particular MBMS to the selected MBMS relay device, the request being relayed from the selected MBMS relay device to a core network.

12. The apparatus of claim 9, wherein the instructions are executable by the processor to:
broadcast content addressed to one or more subscribers to an MBMS, the content being relayed to a network server by at least one of the plurality of MBMS relay devices for distribution to the one or more subscribers to the MBMS.

13. A computer program product for managing a multimedia broadcast multicast service (MBMS), the computer program product comprising a non-transitory computer-readable medium storing instructions executable by a processor to:
broadcast an out-of-coverage status indicator with an MBMS query in a first peer discovery signal;
receive a second peer discovery signal from each of a plurality of MBMS relay devices, each second peer discovery signal comprising at least a subset of service announcement information for at least one MBMS; and
select an MBMS relay device from the plurality of MBMS relay devices to deliver content of a particular MBMS based at least in part on a signal strength of the second peer discovery signal from each MBMS relay device.

14. The computer program product of claim 13, wherein the instructions are executable by the processor to:
initiate a procedure to associate with the selected MBMS relay device.

15. The computer program product of claim 14, wherein the instructions to initiate the procedure to associate with the selected MBMS relay device comprise:
instructions to transmit a request to join the particular MBMS to the selected MBMS relay device, the request being relayed from the selected MBMS relay device to a core network.

16. The computer program product of claim 13, wherein the instructions are executable by the processor to:
broadcast content addressed to one or more subscribers to the at least one MBMS, the content being relayed to a network server by at least one of the plurality of MBMS relay devices for distribution to the one or more subscribers to the MBMS.

* * * * *